United States Patent [19]

Hughes

[11] Patent Number: 5,800,605
[45] Date of Patent: Sep. 1, 1998

[54] PROCESS FOR THE PREPARATION OF ELECTROSTATICALLY CHARGED PARTICLES

[75] Inventor: John Farrell Hughes, Southampton, United Kingdom

[73] Assignee: University of Southampton, Southampton, United Kingdom

[21] Appl. No.: 750,754

[22] PCT Filed: Jun. 13, 1995

[86] PCT No.: PCT/GB95/01372

§ 371 Date: Mar. 21, 1997

§ 102(e) Date: Mar. 21, 1997

[87] PCT Pub. No.: WO96/01285

PCT Pub. Date: Jan. 18, 1996

[30] Foreign Application Priority Data

Jul. 1, 1994 [GB] United Kingdom ............... 9413281

[51] Int. Cl.⁶ .................... C09D 191/06; C09D 191/08; C09D 5/03; C09D 5/46
[52] U.S. Cl. .................... 106/270; 106/271; 106/287.35; 106/499; 106/502
[58] Field of Search ..................... 106/271, 270, 106/287.35, 502, 499

[56] References Cited

FOREIGN PATENT DOCUMENTS

| | | |
|---|---|---|
| 0 234 841 A3 | 9/1987 | European Pat. Off. . |
| 0 260 638 A2 | 3/1988 | European Pat. Off. . |
| 0 493 076 A2 | 7/1992 | European Pat. Off. . |
| 2 272 434 A | 5/1994 | United Kingdom ............ C03C 23/00 |

*Primary Examiner*—David Brunsman
*Attorney, Agent, or Firm*—Fish & Richardson P.C.

[57] ABSTRACT

A process for the preparation of electrostatically charged particles of a high resistivity material which process comprises incorporating a unipolar charge into the material at a temperature at or above the glass transition temperature thereof or above the melting point thereof, the said unipolar charge being incorporated into the bulk of the material and the charged material being subsequently comminuted, or the said charge being incorporated into the material while forming particles thereof.

14 Claims, 1 Drawing Sheet

PROCESS FOR THE PREPARATION OF ELECTROSTATICALLY CHARGED PARTICLES

FIELD OF THE INVENTION

This a 371 of PCT/US95/01372 filed 13 Jun. 1995.

The present invention relates to a process for the preparation of electrostatically charged particles and, in particular, to the preparation of electrostatically pre-charged powders of high electrical resistivity such as powder paint, household cleaning particles and charged particles for biomedical applications.

BACKGROUND OF THE INVENTION

Electrostatic coating techniques are increasingly Used in commercial applications where durable, high quality, finishes are required. Electrostatic coating techniques involve the application, usually by spraying, of electrostatically charged particles, which preferably are pigmented, onto a substrate, generally but not exclusively a metal substrate, followed by baking to form a uniform and adherent coating. The electrical charge of the pigment-containing paint particles causes the attraction of the particles onto the substrate and holds them in place until the heat treatment is applied. Electrostatic coating techniques are used almost exclusively in the domestic white-goods market, and increasingly in the automobile industry. Less well known areas of application include the furnishing industry and bottle coating applications.

There are two known processes for electro-statically charging paint particles which are by corona charging or by tribo or frictional effects. Both of these techniques are known to be inefficient and extremely unpredictable. The important process of charging the powder is the responsibility of the end user and is usually accomplished by means of commercially available equipment.

The corona charging process relies on the creation of a high charge density unipolar ionic cloud, the ions of which subsequently attach onto the outer surface of discreet particles which are dispersed into an airborne cloud. Typically, only about 0.5% of all the charged ions become attached to the airborne particles, the remaining 95.5% remaining as free ions which can be extremely detrimental in coating applications to the quality of the coating.

Tribo or frictional charging of particles is unpredictable and the charging process is sensitive to a number of parameters including the nature of the materials used, relative humidity, duration of contact, relative permittivity, surface conditions, the type of contact and possibly electrical resistivity.

Accordingly, the prior art processes suffer from the disadvantage that the charging of the particles relies upon surface mechanism and the charging process is generally under the control of the end user who will have very little control over the level of charge deposited onto individual particles.

We have now developed a more reproducible process for charging powder particles which overcomes the disadvantages of the prior art.

SUMMARY OF THE INVENTION

Accordingly, the present invention provides a process for the preparation of electrostatically charged particles of a high resistivity material which process comprises incorporating a unipolar charge into the material at a temperature at or above the glass transition temperature thereof or above the melting point thereof, the said unipolar charge being incorporated into the bulk of the material and the charged material being subsequently comminuted, or the said charge being incorporated into the material whilst forming particles thereof.

DETAILED DISCLOSURE

As is known by those skilled in the art the term glass transition temperature is used to define the temperature at which an amorphous material, such as a polymer or glass, changes from a brittle state to a plastic state.

The process of the present invention may be effected either by the incorporation of the unipolar charge into the material by the injection of unipolar charge or by the induction of unipolar charge whilst the material is at or above its glass transition temperature or above its melting point. The unipolar charge may be incorporated into the bulk of the material and particles thereof subsequently formed by comminution, for example by grinding. During the comminution process the material will retain its charge which is effectively locked into the material. Alternatively, the unipolar charge may be incorporated into the material during the formation of particles thereof, for example by extrusion through a nozzle of predetermined aperture. The particles produced in accordance with the present invention may be positively or negatively charged, as desired.

Examples of materials which may be charged according to the process of the present invention are polymeric materials such as polyethylene or epoxy/polyester; or wax materials such as a synthetic paraffin wax or a natural wax, for example Carnauba wax.

The charged particles produced in accordance with the process of the present invention preferably have a particle size in the range of from 10 to 300 μm more preferably in the range of from 10 to 40 μm.

The process of the present invention may be used to produce electrostatically charged particles of a composite polymeric material for use as a powder paint in coating applications, the composite polymer material generally incorporating one or more pigments therein. Other applications for the charged particles of the present invention are for use as household cleaning particles, as charged particles for biomedical purposes and charged particles for insect control purposes.

The present invention also includes within its scope electrostatically charged particles of a polymeric material or a wax wherein a unipolar charge is incorporated within the volume of the particles.

The charged particles of the present invention possess a more reproducible level of charge than was possible using the prior art charging techniques. In particular the advantages are that the electrical charge is located within the volume of the particles and the particles are pre-charged at the manufacturing stage, rather than being charged immediately prior to use. This results in the charge being retained for much longer than surface charged particles and also provides the particles with better sprayability characteristics than the surface charged particles.

BRIEF DESCRIPTION OF THE DRAWINGS

The present invention will be further described with reference to the accompanying drawings, in which;

Referring to the drawings, FIG. 1 illustrates a paint particle 1 which has a negative charge 2 on the surface thereof. The bulk volume of the particle illustrated at 1a by an internal segment view of the particle is not charged. FIG. 2 illustrates a pre-charged particle produced in accordance with the process of the present invention. The particle 3 does not have any charge on the surface thereof. A segment of the interior of the particle is illustrated at 4 where it is clearly shown that the bulk volume of the particle is negatively charged.

Although the particles 1 and 3 are shown with either a surface negative charge or a volume negative charge, respectively, it will be understood that the particles could equally well be provided with a positive unipolar charge.

Figure 1:
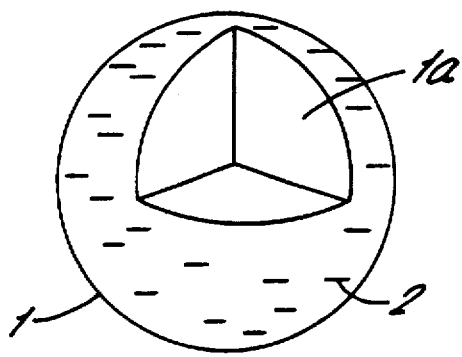
FIG. 1 is a schematic drawing showing the electrical charge sited on the surface of the prior art paint particles.
Figure 2:
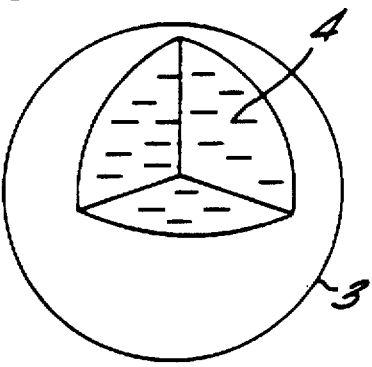
FIG. 2 is a schematic diagram showing the electrical charged sited within the pre-charged paint particles of the present invention.
Figure 3:
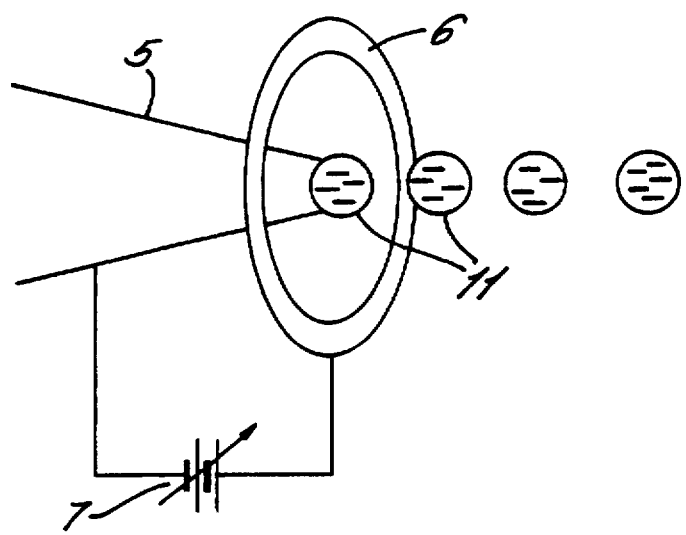
FIG. 3 is a schematic drawing of an apparatus for the induction charging of particles in accordance with the process of the present invention.

The injection of the unipolar charge, either positive or negative charge, is achieved during the formation of the particles. Referring to FIG. 3, this Figure illustrates schematically apparatus for the induction charging of particles, for example of paint, as they are formed. A nozzle through which the polymer is forced is illustrated schematically at 5. The particles 11 form as the material is forced through the nozzle. The particles are passed through an induction ring 6 which is required for the creation of the appropriate electrical field resulting from the application of a voltage by the generator 7. During passage of the particles 11 through the charged ring 6 the material accepts a unipolar charge and as the particles 11 subsequently harden the charge becomes effectively frozen within the volume of the particles.

Figure 4:
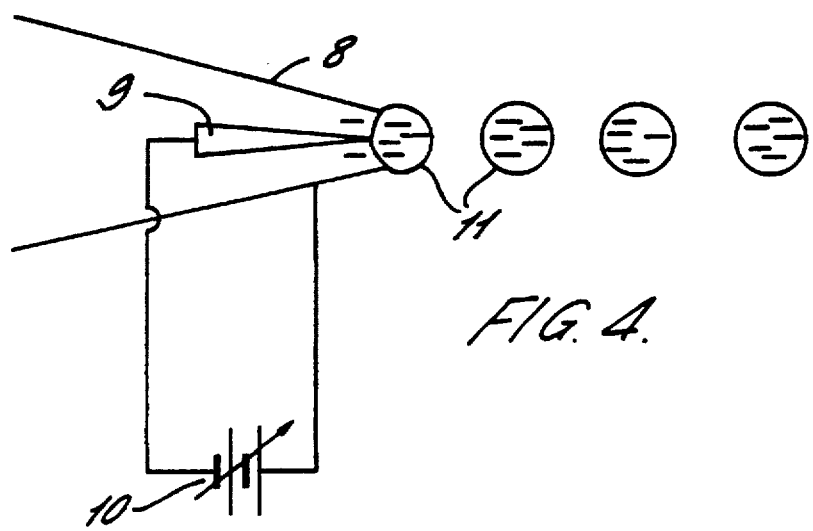
FIG. 4 is a schematic diagram of an apparatus for the corona injection charging of particles in accordance with the process of the invention.

An alternative method for imparting unipolar charge 2 particles is illustrated in FIG. 4 in which the nozzle through which the molten material is extruded is shown schematically at 8. The material is extruded through the nozzle 8 and particles 11 are formed during this process. A high voltage electrode 9 is incorporated within the nozzle and supplies a unipolar injection of charge into the bulk of the molten material as the beads 11 of the material are formed. The high voltage to the electrode 9 is supplied by the generator 10.

Charge injection either by high field injection, or by induction, may also be achieved by the incorporation of similar electrodes adjacent the final cooling roller systems in conventional extruders. Normally, the material will be produced in sheet form, to be subsequently ground into a fine powder.

The present invention will be further described with reference to the following Examples.

EXAMPLE 1

Unipolar charge injection into a molten example of an epoxy/polyester composite polymer was carried out using an electrode similar to that illustrated in FIG. 4 of the accompanying drawings. The polymer sample size was 4.5 cm in diameter and 0.6 cm thick. The temperature was maintained at approximately 100° C., at which temperature the sample was above its glass transition temperature. Whilst at this temperature, a potentially −3 KV at the sharp pointed electrode was maintained for a period of time during which the sample re-solidified. A initial charge value of $-0.1 \times 10^{-9}$ was measured within the sample. The following day the charge value was the same and subsequently stabilised at approximately this value. The epoxy/polyester composite polymer sample was then subsequently comminuted.

EXAMPLE 2

Unipolar charge injection into a molten sample of Carnauba wax was carried out using an electrode arrangement similar to that illustrated in FIG. 4 of the accompanying drawings. The wax sample size was 4.5 cm in diameter and 0.6 cm thick. The temperature was maintained at approximately 130° C. at which the wax was molten. Whilst molten, a potential of 40 volts was maintained at the pointed electrode for a period of time corresponding to the time taken for the wax to re-solidify. An initial charge value of $-0.3 \times 10^{-9}$ Coulombs was measured within the sample. The next day this value had decreased to $-0.19 \times 10^{-9}$ Coulombs. This value was maintained over a period of weeks. The wax sample was subsequently comminuted.

I claim:

1. A process for the preparation of electrostatically charged particles of a high resistivity material which process comprises incorporating a unipolar charge into the material at a temperature at or above the glass transition temperature thereof or above the melting point thereof, either the said unipolar charge being incorporated into the bulk of the material and the charged material being subsequently comminuted, or the said unipolar charge being incorporated into the material whilst forming particles thereof.

2. A process as claimed in claim 1 wherein the incorporation of unipolar charge is effected by injection of unipolar ions into the material.

3. A process as claimed in claim 1 wherein the incorporation of unipolar charge is effected by induction of unipolar ions into the material.

4. A process as claimed in claim 1 wherein the unipolar charge is incorporated into particles of the said material during the formation of the said particles by extrusion.

5. A process as claimed in claim 1 wherein the material is a polymeric material or a wax.

6. A process as claimed in claim 5 wherein the material is a polymer paint.

7. A process as claimed in claim 5 wherein the material is a synthetic paraffin wax or a natural wax.

8. A process as claimed in claim 1 wherein the electrostatically charged particles have an average particle size in the range of from 10 to 300 µm.

9. Electrostatically charged particles of a polymeric material or wax wherein a unipolar charge is incorporated within the volume of the particles.

10. Electrostatically charged particles as claimed in claim 9 wherein the material is a polymer paint.

11. Electrostatically charged particles as claimed in claim 9 wherein the material is a synthetic paraffin wax or a natural wax.

12. Electrostatically charged particles as claimed in claim 9 which have an average particle size in the range of from 10 to 300 µm.

13. A powder paint which comprises electrostatically charged particles having a unipolar charge incorporated therein.

14. A powder paint as claimed in claim 13 in which the charged particles have an average particle size in the range of from 10 to 300 µm.

* * * * *